United States Patent
Corlett, Jr. et al.

[15] 3,683,550
[45] Aug. 15, 1972

[54] PLANT CULTURE METHOD AND PRODUCT

[72] Inventors: Donald A. Corlett, Jr., Concord; Panos D. Caldis, Berkeley, both of Calif.

[73] Assignee: Del Monte Corporation, San Francisco, Calif.

[22] Filed: April 1, 1970

[21] Appl. No.: 24,610

Related U.S. Application Data

[63] Continuation-in-part of Ser. No. 826,445, May 21, 1969, abandoned.

[52] U.S. Cl. ....................................47/58
[51] Int. Cl. ...................................A01g 1/00
[58] Field of Search.........................47/58

[56] References Cited

UNITED STATES PATENTS 3,514,900   6/1970   McDade.................47/58

OTHER PUBLICATIONS

R. " Notes on the---," Kohl, Amer. Orchid Soc. Bull., February 1962, pp. 116– 120.
S. " Nutritional Requirements," Wolter et al., Amer. Journ. Botany, 53(3)1966, pp. 263– 266.
T. " Mineral Oil--," Caplin, Amer. Journ. Botany, May 1959, pp. 324– 329.
U. " Growth of--," Hildebrandt et al., Amer. Journ. of Bot., March 1963, pp. 248– 254.
V. " Tissue Culture," Morel, Amer. Orchid Soc. Bull., June 1964, pp. 473– 477.

*Primary Examiner*—Robert E. Bagwill
*Attorney*—Flehr, Hohbach, Test, Albritton & Herbert

[57] ABSTRACT

A method for reproducing large numbers of pineapple plants using a three stage plant tissue culture technique. Also the product of latent embryoid tissue (i.e., bud clusters) used in the same technique. In an induction stage, latent embryoid tissue is derived and induced to grow from an excised plant meristem. Such tissue is then grown or proliferated in an aqueous nutrient medium under conditions whereby differentiation of tissue into plantlets is inhibited. In a preferred method, the latent embryoid tissue is proliferated to a desirable amount and then transferred to a storage bank for unlimited storage. When desired, a portion of tissue may be removed from the bank and further proliferated. Also, the storage bank product. Then, in a differentiation stage, the latent embryoid tissue is caused to differentiate into plantlets.

21 Claims, 4 Drawing Figures

Patented Aug. 15, 1972 3,683,550
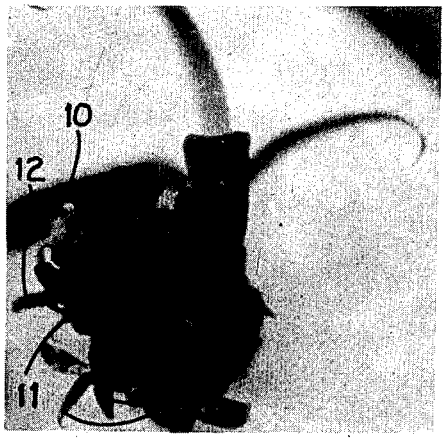
FIG_1
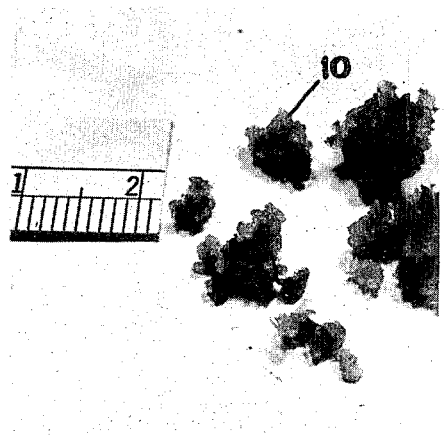
FIG_2
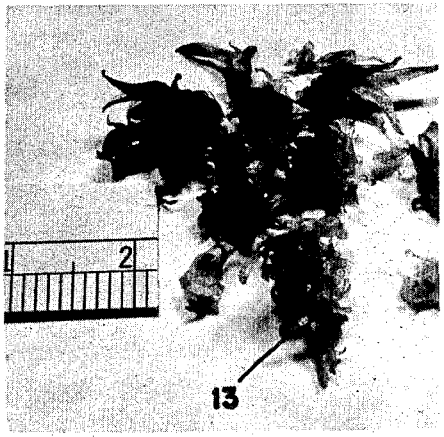
FIG_3
FIG_4
INVENTORS
Donald A. Corlett, Jr.
Panos D. Caldis
BY Flehr, Hohbach, Test,
Albritton & Herbert
ATTORNEYS

PLANT CULTURE METHOD AND PRODUCT

CROSS-REFERENCE TO RELATED APPLICATION

This application is a continuation-in-part of copending U.S. application Ser. No. 826,445 in the names of Donald A. Corlett, Jr. and Panos D. Caldis, filed on May 21, 1969, and now abandoned.

BACKGROUND OF THE INVENTION

Many plants are not propagated from seeds because of the genetic variability of the seed. Therefore, these plants are propagated asexually which permits the maintenance and multiplication of any genotype as clones. A commercially valuable plant which is propagated asexually with shoots, slips, and crowns is the pineapple (*Ananas comosus*).

Asexual propagation, while permitting generation of suitable clones, has some severe restrictions. The most severe is that each donor plant gives only enough planting material for three to five new plants under commercial conditions. With special techniques, more plants may be obtained, but the number is less than 40 from one plant. It may take a number of years to produce sufficient numbers of a new hybrid or clone to stock a plantation by vegetative propagation. In addition, since all new plants must come from an existing previous crop, there is a great expenditure for retrieving the plant material and, as well, problems created by carry-over of pests and plant diseases. Consequently, there is a need for a more satisfactory propagation technique for plants now propagated asexually from field material.

Tissue culture and related techniques have been used in connection with the study and reproduction of many species of plants for many years. So, for example, in the case of strawberries, these techniques are used for the purpose of freeing a variety from an infecting virus. So, also allied techniques have been used for the multiplication of meristem derived protocorms for asexual propagation of orchids and carnations. These techniques, however, lead only to growth of protocorm-like organs by geometrically increased numbers. It would require large storage space to maintain sufficient quantities of protocorms, derived from a variety of desirable plants, to reproduce thousands of plantlets of each strain in relatively short periods of time.

Undifferentiated tissues derived from the pith of tobacco plants have been propagated and differentiated into plantlets under the influence of strong growth hormones, however, such tissues exhibit genetic instability and often lose the ability to initiate organs. Since the plantlets are not identical to the parent, such a technique cannot be used where identical plants are needed. Still other techniques have been developed for growth of large amounts of plant tissue to be consumed as food or fodder. However, none of these techniques have been successfully used to propagate large numbers of plants identical to the parent through proliferation of undifferentiated tissue.

SUMMARY OF THE INVENTION AND OBJECTS

This invention relates to a plant culture technique for reproducing large numbers of plants from latent embryoid tissue (i.e., bud clusters) and to the latent embryoid tissue used in the culture technique. Three stages of the method are: induction, proliferation, and differentiation. The latent embryoid tissue may be obtained in an induction stage preferably performed by the excision from a donor plant of meristem tissue which is induced to grow latent embryoid tissue which, in turn, is placed in an aqueous nutrient medium. Next, in a proliferation stage, latent embryoid tissue, which may be obtained in the induction stage or from other sources, is proliferated in an aqueous nutrient medium under conditions whereby differentiation of tissue into plantlets is inhibited. In a preferred method of proliferation, the latent embryoid tissue is proliferated to a desirable amount for storage and transfered to a storage bank wherein it may be maintained for an unlimited period of time. When desired, a portion of tissue may be removed from the bank and directly differentiated or, if necessary, may be again proliferated. In the last stage, differentiation, the latent embryoid tissue is caused to differentiate into plantlets which may be field planted.

It is an object of the present invention to provide an improved plant culture technique for plant reproduction.

A further object of the present invention is to propagate plants by modified tissue culture techniques.

A further object of this invention is to make possible the development and reproduction of new strains of plants in a fraction of the time heretofore required.

A further object of this invention is to produce large numbers of plants from a single plant having desired characteristics.

A further object of this invention is to produce large quantities of plants having identical characteristics which are at generally the same stage of development at the time of planting so that they may be cultivated and harvested together.

It is a further object of this invention to produce a storage bank of undifferentiated plant tissue from which tissue may be withdrawn at will and propagated to supply large quantities of plantlets.

Another object of the invention is to provide a plant culture method of the above character which is applicable to inducing large numbers of pineapple plants from meristem tissue within a relative short period of time.

A particular object of the invention is to provide tissue from pineapple meristem from which large numbers of plants may be developed.

Further objects of this invention will be more apparent from the following description taken in conjunction with the accompanying drawing.

BRIEF DESCRIPTION OF THE DRAWING

FIGS. 1, 2, 3, and 4 are reproductions of photographs showing various stages of the product of the invention.

DETAILED DESCRIPTION OF THE PREFERRED EMBODIMENTS

According to this invention, a variety of plants may be propagated asexually using plant tissue culture techniques. A donor plant is selected having the desired genetic characteristics for development into a large number of plants. "Latent embryoid tissue" is defined as green, granular, friable tissue which is genetically stable and which when grown pursuant to the plant tissue culture methods of this invention is capable of proliferation without substantial differentiation into plantlets, and which, upon a change of culture conditions, is capable of differentiation into plantlets. It should be understood that the granular tissue defined herein as latent embryoid tissue comprises clusters of individual pineapple buds referred to herein as bud clusters. Accordingly the two terms are employed interchangeably in the present specification.

FIGS. 1, 2, 3, and 4 are photographs showing various development stages of the latent embryoid tissue derived from a pineapple plant and separated from aqueous nutrient medium. The scale, indicated in FIGS. 2 and 3 by a ruler marked in centimeters and decimal portions thereof, is approximately 2½ times full size for all photographs. FIG. 1 shows latent embryoid tissue 10 growing from remnants of originally excised meristem tissue derived from a mutilated bud portion 11 of a pineapple plant as the remnants appear during induction. Shoots may also develop in the induction stage. Prior to the proliferation stage, meristem tissue 10 is separated from tissue 11 and from shoots having leaves 12 growing therefrom. FIG. 2 shows relatively undifferentiated tissue 10 as it may appear during proliferation. Such tissue is suitably pure to be stored in a tissue bank. FIG. 3 shows partial plantlets 13 formed from tissue 10 during the differentiation stage. FIG. 4 shows differentiated plantlets including roots 14 and leaves 12 formed from tissue 10.

In the initial stage (i.e., induction) a portion of the plant composed of meristem tissue, such as the buds, tip of roots and leaf nodes, is excised from the plant. In the pineapple plant, the preferred source of meristem tissue is the apical or lateral buds, both types being present in the crown, and on the stem of the plant and its slips or suckers. The leaves are removed to expose the apical and lateral buds which are then mounted for careful removal of the bud scales, leaving one bud scale (leaf primordium) over the meristem dome. The single bud scale increases the survival of the mutilated meristem bud. Following the removal of the bud scales, the meristem is mutilated to modify its organization. This procedure hastens the elaboration of latent embryoid tissue from the bud meristem. Simple excision of the meristem from the bud is sufficient to induce latent embryoid tissue but induction is slow and/or sporadic.

This mutilation operation may be performed in a number of ways, as by crushing or cutting. It is preferred to score the meristem dome with shallow cuts by small knife. By cross-cutting the dome, mutilzation is both thorough and uniform. In a preferred mutilating technique several shallow parallel cuts are made in a first direction across the top of the meristem and, then, approximately the same number of cuts are made at right angles to the first cuts. The mutilated meristem tissue is then placed in an aqueous plant nutrient medium, to be described hereinafter.

Latent embryoid tissue is then induced to grow on the mutilated meristem by placing the same in the aqueous nutrient medium. Under certain conditions, growths such as shoots, rather than the desired tissue, are formed on the meristem. If so, by periodically cutting back such new growths (e.g., at intervals of once a week) latent embryoid tissue eventually will be induced to grow so long as the meristem remains viable.

When the latent embryoid tissue is first formed, it is undifferentiated but has a strong tendency under certain conditions to differentiate into plantlets. A critical consideration in the subsequent induction and in the proliferation stage is the maintenance of conditions which substantially inhibit differentiation of the latent embryoid tissue into plantlets. Differentiation into plantlets is undesirable at this stage since the plantlets absorb nutrient and seriously detract from latent embryoid tissue growth. However, as shown in FIG. 1, some differentiation normally occurs.

One condition to inhibit differentiation during induction and proliferation is to keep the latent embryoid tissue substantially submerged in the aqueous nutrient medium. This inhibits differentiation by shielding the tissue from the atmosphere, thus preventing surface dehydration which promotes differentiation.

Any suitable liquid nutrient medium for plant tissue culture may be used during induction and proliferation of which a number are known to those skilled in the art. Conventional media provide sources of carbohydrate (e.g., sucrose), vitamins, trace metallic elements and mineral ions (potassium, magnesium, iron, calcium, nitrate, phosphate and sulfate). In practice such aqueous media may include about 1.5 to 3 percent, preferably about 2 percent, by weight of carbohydrate along with the aforementioned vitamins an mineral ions. Although various hormones have been used in media available in the art, it is preferred to exclude all such hormones during all stages of culture of latent embryoid tissue (induction, proliferation, and tissue banking stages) since they are not necessary to carry out the technique of this invention and could produce undesirable side effects in the latent embryoid tissue and plantlets.

An improvement of differentiation control in conventional media may be accomplished by adjusting the iron concentration therein. It has been discovered that an increase in the ferrous ion concentration from the amount in conventional media, about 2.5 mg/l, two to six-fold, to about 5–15 mg/l of medium, and preferably 12.5 mg/l of medium, markedly inhibits differentiation while permitting development in mutilated meristem while promoting induction and development of latent embryoid tissue.

Another desirable improvement in a conventional medium is the inclusion of a polyvinylpyrrolidone such as Polycar AT produced by General Analine & Film Corporation. Polycar AT is a fine, granular, white powder insoluble in the medium and may be added to the medium at about 50–200 g/l of medium. The chief value of Polycar AT in the medium is its ability to absorb toxic phenolic compounds and browning substances from the nutrient medium solution. Thus, Polycar AT prevents some destructive browning which may occur in plant tissue cultures. It also may increase the growth rate of latent embryoid tissue cultures by removing the toxic effects of these browning agents.

When the pineapple is the donor plant, it is desirable to adjust the nutrient medium during induction and proliferation to a pH of between 4 and 5 and, preferably, to 4.5 the pH of the natural growth of pineapple in soil. Above and below this pH, the growth rate of the latent embryoid tissue tends to decrease.

During the induction stage, it is preferred to agitate the medium in order to circulate oxygen and the nutrients of the aqueous medium to all the cells of the latent embryoid tissue. A reciprocal shaker or rotary roller drum may be used.

Although light is not deemed to be necessary during induction, it is highly desirable. The light intensity at the surface of the meristem typically is between about 400 and about 600 foot candles regardless of the agitation device, although intensities as low as 200 foot candles may be used. Optimally 500 foot candles promotes raid growth and development of the meristem. The light source should be low in infra-red radiation, which has the undesirable effect of accentuating shoot formation. Therefore, the light primarily should come from "cool-white" fluorescent lamps of either the regular or high intensity type although filtered sunlight or any suitable light source would be satisfactory.

With pineapple as the donor plant, growth in the nutrient during induction should be carried out at temperatures elevated slightly above normal room temperature. The range of temperatures between about 21° and 30° C may be used. However, in order to suppress differentiation, the temperature of new latent embryoid tissue in the flask preferably should be maintained between about 23° and 24.5° C.

After a sufficient quantity of latent embryoid tissue has been induced to grow on the meristem in the aqueous nutrient medium, the latent embryoid tissue is separated from the meristem and any plantlets that have developed. Typical latent embryoid tissue at this stage is shown in FIG. 2. The separated tissue is then placed in a flask in a medium similar to the one described to commence a preliminary proliferation stage. During this stage, the tissue is substantially submerged in the liquid medium to avoid direct contact with the atmosphere, and consequent dehydration at the surface, and exposure to oxygen. The conditions previously described are followed. By way of example, the mass of the tissue in this proliferation operation may be increased ten times or more.

Following preliminary proliferation, alternate series of steps may be performed prior to differentiation into plantlets depending upon the desired result. In one procedure, the total preliminary tissue is massively proliferated as discussed hereinafter. In another procedure, the preliminary tissue is split up, a portion being placed in a storage bank, as discussed hereinafter. In still another procedure, all the preliminary tissue is placed in a storage bank, a portion of which is removed at a later time to supply tissue for massive proliferation.

During massive proliferation, the growth rate is substantially increased. Starting portions of latent embryoid tissue are placed in separate flasks. This is essentially a continuation of the preliminary proliferation stage, but on a larger scale. By way of example, the increase in the mass of tissue during massive proliferation may be of the order of ten times or considerably higher. However, any differentiated tissue, such as shoots and leaves, is removed from the tissue and only the undifferentiated, green tissue is transferred to the flasks.

The removal of differentiating tissue performed at the beginning of proliferation, serves to inhibit further differentiation. In like manner, any differentiating tissue is periodically removed from the tissue throughout massive proliferation to inhibit differentiation. Such differentiated tissue is visually detectable when small leaf tissue appears, and may be removed manually from time to time.

During massive proliferation, the latent embryoid tissue is placed at the bottom of a flask with sufficient liquid medium added to cover the tissue with the exception of a small portion, such as within about 2 or 3 millimeters of the surface of the tissue. If large portions of the surface of latent embryoid tissue are exposed, the tissue, especially the upper portion thereof, will spontaneously differentiate into plantlets. On the other hand, if the latent embryoid tissue is completely or continuously submerged during massive proliferation, it grows at a very slow rate and tends to discolor.

In practice massive proliferation of pineapple embryoid tissue has been carried out at temperatures within the range of about 20° C to about 30° C. Above 30° C, the tissue tends to brown, thus retarding proliferation. On the other hand, the growth rate is restricted beyond the lower limit of 20° C. For most vigorous growth, the optimum temperature is preferably about 27° C.

During massive proliferation, the lighting may be generally the same as in the induction stage although a broader range of light intensity (e.g., 200–1,000 foot candles) is normally employed.

As in the induction stage, some agitation to bathe the tissue with nutrient is desirable during proliferation. The agitation promotes the supply of nutrients to the tissues, removes wastes from the tissues, and aerates the tissue. Accordingly, it is preferred to have gentle agitation on a tissue culture roller tube rotating at about one rotation per minute. Alternatively, a shaker may be used so long as there are less than about 100 shakes per minute.

After massive proliferation, the tissue may be sent directly to the differentiation stage and caused to differentiate into plantlets under conditions described hereinafter.

In an alternative procedure, instead of performing massive proliferation directly after preliminary proliferation, the tissue may be either all banked (i.e., stored) followed by massive proliferation at a later time or split with a portion being massively proliferated and a portion stored. During the storage stage, the tissue is placed in a supply bank which provides a means for maintaining specific latent embryoid tissue cultures of various plants indefinitely in a ready state. These latent embryoid tissue cultures are maintained in the bank under conditions which permit tissue which is substantially undifferentiated to grow at a relatively slow rate. A portion of the stored tissue may be removed and differentiated or may be proliferated in a post-storage stage and then differentiated. The conditions for differentiation will be described hereinafter. The remaining portion of the tissue is then returned to the storage bank.

To prepare a latent embryoid tissue bank for the storage stage, each culture to be placed in the bank must be tested to verify its ability to proliferate and differentiate into plantlets. Enough green, healthy latent embryoid tissue consisting of only undifferentiated material, free from contaminating micro-organisms, is aseptically placed in the butt of a sterile tube, e.g., a cotton stoppered, lipless, glass tube (i.e., 22 mm × 15 cm) to fill the tube to 3 cm. Enough sterile nutrient medium of the type previously described is aseptically pipetted into the tube to cover the tissue by about 1 cm, producing a total of about 4 cm of latent embryoid tissue and medium. After filling the tube, the tissue is allowed to incubate. These tubes having the above contents may then be placed at an angle on a Tissue Culture Rollerdrum (New Brunswick Scientific Co., TC–4) or any suitable rack that revolves continuously at about one revolution per minute. The tubes are incubated on the rack at a tissue temperature of about 20° to 25° C and preferably about 21° C under continuous light. The light should be produced from fluorscent "-cool-white" light source low in the infra-red wave length. The light intensity preferably should be no more than about 200 foot candles on the tubes at the top of the roller drum for slow growth although the intensity may be increased if faster growth is desired.

Plantlets, if they occur spontaneously during incubation, should be removed at least every 2 weeks, at which time the medium should also be brought up to about 1 centimeter above the latent embryoid tissue. The level of the latent embryoid tissue in the tube will increase as the tissue grows.

About every month of incubation the old medium and the upper portions of latent embryoid tissue should be removed so that only 3 centimeters of the tissue remains. This is necessary since the tissue approximately doubles every two weeks. The old medium should be removed and new medium added until the contents reach a 4 cm level, and the old cotton-stoppers discarded and replaced with new ones. This method may be used to maintain the tissue in an undifferentiated state indefinitely.

The above quantities in the bank are meant by way of example, not limitation. These quantities illustrate that the tissue should be substantially submerged to inhibit differentiation.

Aseptic conditions must be scrupulously adhered to in all phases of the tissue-bank procedure. The cultures should be examined micro-biologically once a month when the medium is changed to detect contamination.

One problem that might be encountered in the operation of the tissue bank is the browning and death of culture. One cause of browning results from the latent embryoid tissue becoming too packed in the base of the tube. This can be overcome by punching a hole through the latent embryoid tissue to the bottom of the tube. Another cause of browning is the accumulation of toxic phenolic and other compounds in the nutrient solution. As previously discussed, the addition of Polycar AT is a preventative for browning caused by these toxic compounds.

The latent embryoid tissue may be conveniently transferred from the bank to another destination by placing a portion (e.g., 10 grams) of the latent embryoid tissue in a sterile vial, covering the tissue with nutrient medium and sealing the vial. The tissue can survive in these vials for 4 to 5 days at room temperature in the absence of light.

With pineapple meristem, it ordinarily takes about at least 3 months to perform the induction and proliferation stages with most of the time consumed during induction.

The tissue treated according to this invention is bifunctional in nature in that it can grow as undifferentiated latent embryoid tissue and also differentiate into plantlets. After sufficient latent embryoid tissue for the number of required plantlets has been proliferated or after a desired amount has been withdrawn from a tissue bank and proliferated, if necessary, to the required amount, the differentiation stage is carried out.

During the differentiation stage, it is desirable to promote the latent embryoid tissue to differentiate rapidly into plantlets. The rapid growth during differentiation results in a substantially synchronous maturation and development into plantlets which may be planted over a short period of time. When grown in the field, these plantlets yield a harvest of fruit at approximately the same stage of maturation, a desirable commercial feature.

In an optional method for assisting synchronous maturation latent embryoid tissue may be bathed with a small quantity of an aqueous solution of a growth promoting agent, such as gibberellic acid at a low dilution (e.g., 0.1 to 100 $\mu$g/ml of solution). However, such treatment is not essential.

The conditions for the differentiation stage are different from that of either the proliferation or the storage stages. Perhaps the most important change in conditions is to expose most or a substantial part of the latent embryoid tissue to the atmosphere while a lower and relatively minor portion of the latent embryoid tissue is in contact with aqueous nutrient medium. In one technique this is accomplished by lowering the level of the nutrient medium in the container used for proliferation. The container may be agitated for uniform exposure of tissue to the atmosphere. Such exposure, with access to nutrients and waste systems, causes the differentiation of latent embryoid tissue as shown in the beginning steps in FIG. 3. Maintenance of such condition serves to promote differentiation of latent embryoid tissue into plantlets having leaves and roots, such as in FIG. 4.

In another exposure technique, the latent embryoid tissue may be deposited onto an aqueous agar gel having the necessary nutrients. Since a substantial portion of the tissue is thereby open to the atmosphere, there is no need to assist uniform exposure by agitation. This technique assists the formation of healthy roots since the same, being gravitropic, grow into the agar as in a natural environment. For this purpose, the gel is preferably sufficiently rigid for support but soft enough to permit root formation therein. A suitable gel concentration is about 1.0 to 1.4 percent and preferably about 1.2 percent of agar, by weight of the medium. Sterilized soil may be employed to replace the agar with a similar effect.

During the differentiation, it has been found that the rate of forming healthy plantlets is influenced by the nutritional content of the aqueous medium in contact with the latent embryoid tissue. If such content is too high, tissue proliferation, rather than differentiation, is favored with a consequent lowering of the rate of the latter. On the other hand, if the nutrient content is too low, the rate of differentiation is accelerated but at the cost of injuring a certain number of plantlets due to deficient nutrition. Accordingly, the nutrient concentration employed for proliferation is reduced by about 50 to 90 percent, preferably 70 to 80 percent, in the differentiation medium. Suitable differentiation media include about 0.25 to 1 percent, preferably about 0.5 percent, by weight of carbohydrate (e.g., sucrose) along with adequate vitamins and minerals.

To further promote differentiation, the conditions of light and temperature are also changed to induce differentiation. The light intensity may be substantially increased such as to about 1,000 foot candles or less at the tissue surface with about 10 percent of the light coming from incandescent lamps. In addition, the temperature may be raised to about 30° C.

During the differentiation stage, by the time the plantlets are about 2 cm high, they have differentiated to the extend that all of the characteristic features of the plant are exhibited and all the plantlets can be grown in soil or other media as is currently practiced in the art. Additional growth is ordinarily necessary following differentiation before the plantlets are placed in the field. Under conventional planting conditions, shoots or suckers should weigh at least about 100 gm and are 6 to 8 inches tall at the time of field planting.

As with other tissue culture techniques, it is desirable to use aseptic techniques throughout. Unless all glassware, media, pipettes, utensils, etc., are sterile, there is danger of contamination. Contamination not only can affect the large numbers of plants ultimately differentiated according to the present process it might also destroy the meristem or latent embryoid tissue in the first instance. Glass distilled water should be used for purity and is intended when the word "water" is used herein.

EXAMPLE I

A pineapple crown was cut off to remove the portion containing the apical bud. The leaves were stripped off and the fleshy stem was washed in a mild detergent. The top portion of the crown containing the meristem was separated and disinfected in a 10 percent bleach–90 percent cool water solution for ten minutes, and placed in a sterile container.

The tissue containing the bud was mounted to a cardboard platform and the bud scales carefully removed until one bud scale was present over the meristem dome. The meristem was quite small on the order of 0.25 millimeters in diameter. It was then mutilated by means of shallow cuts with a small knife. Several shallow parallel cuts were made in a first direction across the top of the meristem and then approximately the same number of cuts were made at right angles to the original cuts. The scored meristem and some of the adjacent basal tissue (about 1 cubic millimeter) was placed in a 125 ml flask. About 6 milliliters of liquid nutrient medium was added and the flask was placed on a reciprocal shaker. The medium was prepared as follows. A double strength basal salt solution was first prepared by adding the following ingredients to 5 liters of water.

| Salt | Amount |
| --- | --- |
| $NH_4HO_3$ | 16.5 gm |
| $KNO_3$ | 19.0 gm |
| $CaCl_2 \cdot 2H_2O$ | 4.4 gm |
| $MgSO_4 \cdot 7H_2O$ | 3.7 gm |
| $KH_2PO_4$ | 1.7 gm |
| $H_3BO_3$ | 62 mg |
| $MnSO_4 \cdot H_2O$ | 169 mg |
| $ZnSO_4$ | 106 mg |
| KI | 8.3 ml |
| Stock Solution A | 5 ml |
| Stock Solution B | 1 ml |
| Stock Solution C | 10 ml |

Stock Solution A is a chelating agent known as NaFeEDTA (Sequestrene, produced by Geigy Industrial Chemicals) which was prepared by adding 3.8 grams of the chelating agent in 100 ml of water.

Stock Solution B was prepared by adding 25 mg of $CuSO_4 \cdot 5H_2O$ and 25 mg $CoCl_2 \cdot 6H_2O$ in 100 ml of water.

Stock Solution C was prepared by adding 25 mg of $Na_2MoO_4 \cdot 2H_2O$ in 100 ml of water.

The ordinary nutrient medium used in this example was prepared by adding 20 grams sucrose, 100 mg meso-inositol, 500 mg casein hydrolysate and 1 ml of thiamine-HCl stock solution (prepared by dissolving 50 mg thiamine-HCl in 100 ml water) to 500 ml of the double strength basal salt solution. The pH was adjusted to 4.5 using 0.1 N hydrochloric acid. The final volume of the medium was adjusted to 1 L with water.

The scored meristem, together with some adjacent basal tissue was placed in the foregoing nutrient media and agitated on a reciprocal shaker at a temperature between 25° and 27° C. The flask was subject to constant illumination from fluorescent light (500 foot candles, no incandescence). Low infra-red producing fluorescent lights were employed. The medium was changed every 7 days.

The scored meristem was permitted to grow in the nutrient medium for several weeks. After 4–6 weeks, the masses of budding tissue were divided up into four separate parts and again placed in 6 ml of nutrient media and subjected to further agitation under constant illumination. As small plantlets were developed throughout this step, they were separated and discarded. The uniform, undifferentiated latent embryoid tissue, green in color, was permitted to develop in the medium by the removal of the small plantlets.

After the development of an appreciable quantity, such as 1 or 2 grams of the latent embryoid tissue, it was placed in a 125 ml flask containing 10 ml of nutrient medium.

During proliferation, the latent embryoid tissue was constantly agitated and illuminated in the nutrient medium until the bottom of the 125 ml flask was covered by a layer about 2 or 3 cm thick. This tissue was then transferred to larger flasks and grown further by the same technique until the desired quantity of latent embryoid tissue was obtained. The liquid level of the medium was kept within 2 or 3 mm of the surface of the tissue to inhibit spontaneous differentiation into plantlets without causing browning of the tissue. The occasional plantlets that were formed were weeded out whenever the medium was changed. The medium was changed each week.

When it was desired to differentiate the latent embryoid tissue into plantlets, gibberellic acid in the amount of 10 $\mu$g/ml was added to the medium. The tissue was bathed under substantially submerged conditions at a temperature of about 28° C to about 30° C under constant illumination by daylight-simulating fluorescent lights (1,000 foot candles, 10 percent incandescence). At the end of 3 days the medium, containing the gibberellic acid, was drained and the tissue was spread in a layer about 1 cm thick in a 500 ml Erlenmeyer flask. Four ml of medium, absent gibberellic acid was added and the flask was again agitated under the conditions of temperature and light as described with respect to the gibberellic acid medium. The consumption and evaporation of the nutrient medium required the addition of 4 ml at least every 7 days. In 8 weeks, plantlets measuring 2 cm in height were formed which were planted in soil in the laboratory or other controlled environment. After these plantlets had grown to a height of about 6 to 8 inches, they were ready for planting in the field.

Because all the plantlets were growing from a mass of latent embryoid tissue produced at the same time and because of the effect of the growth-promoting agent, gibberellic acid, the stage of development of the plants was relatively similar so that planting conveniently took place over a short period of time with the result that pineapple plants will bear fruit simultaneously.

The differentiation in the plants was also carried out on the surface of solid agar. Any suitable nutrient medium was used, but satisfactory results have been found using Hill's Orchid Culture Medium of unknown composition, known to those in the orchid-growing art. No agitation was employed. The flasks were incubated at 28°–30° at 500–1,000 foot candles of light.

EXAMPLE 2

Using the general procedure of Example 1, large scale plantlet production was carried out. The procedure consists of three steps: the first two for rapidly proliferating latent embryoid tissue and the third for large scale proliferation, differentiation and plantlet maturation.

In step 1, one ounce of latent embryoid tissue from pineapple meristem was proliferated into 2 ounces in 7 days.

In step 2, the 2 ounce quantity of latent embryoid tissue obtained by step 1 was divided into two flasks, 1 ounce per flask, whereupon it was proliferated into a total quantity of 5 ounces in 10 days.

In step 3, 5 ounces of latent embryoid tissue, obtained by steps 1 and 2 in 17½ days, was then divided evenly into 10 flasks (500 ml), one-half ounce per flask. The latent embryoid tissue was present in each flask. The rate of weight increase was approximately constant.

On the 40th day conditions were changed to favor differentiation (i.e., low liquid level, temperature increase, and increase in light intensity, especially in the infra-red wavelengths).

Differentiation occurred between 40 and 45 days. The rate of weight gain the flasks changed from the 42d day on, indicating the growth of plantlets instead of latent embryoid tissue. Differentiation occurred at the end of 62 days, at which time the tissue weight averaged 3½ ounces per flask. The 10 flasks yielded a total of 10,000 plantlets.

The quantitive aspects of producing 10,000 plants from an initial 1 ounce quantity of latent embryoid tissue are outlined in Table I.

TABLE I

| Time (Days) | Step | Stage | Weight (ounces) |
|---|---|---|---|
| 0 | 1 | Latent embryoid tissue | 1 |
| 7 | | Proliferation | 2 |
| 7 | 2 | Latent embryoid tissue | 2 |
| 17-½ | | proliferation | 5 |
| 17-½ | 3 | Latent embryoid tissue | 5 |
| 40 | | Proliferation | 11-½ |
| 40 | | Differentiation | |
| 45 | | Into plantlets | |
| 45 | | Plantlet | 35.5 oz = |
| 62 | | Maturation | 10,000 plantlets |

The growth or proliferation rate of latent embryoid tissue is slower than the growth rate of plantlets. One reason is that although the initial growth rate of latent embryoid tissue is high, it slows down due to lack of physical space. After differentiation occurs, there is a finite number of plants which are able to grow upward. This is the reason the initial latent embryoid tissue proliferation is carried out stepwise in increasing numbers of flasks with frequent changes of medium.

EXAMPLE III

The procedure of Example I was essentially followed during induction and proliferation with the following modifications during differentiation. Treatment with gibberellic acid was omitted as not being considered necessary for synchronous differentiation. The tissue was transferred from the 125 ml proliferation flask and placed in a uniform manner onto the surface of a soft aqueous agar gel containing a nutrient medium of the same type as employed for proliferation, but diluted to one-quarter strength by the addition of water. The agar was present in the amount 1.2 percent by weight of the nutrient medium solution. The tissue was substantially entirely exposed to the surrounding air with a minor lower portion in contact with, and deriving nourishment from the medium in the agar. The flasks were incubated at about 28°–30° C at 500–1,000 foot candles of light with no agitation. The medium was replaced about as frequently as in Example 1. By employing the above technique, the yield of healthy usable plantlets was higher than that obtained from either of the differentiation methods of Example I.

With respect to the differentiating technique used in Example I, it was noted that while gibberellic acid accelerated differentiation, the pineapple plantlets tended to be spindly. Such plants may have a serious mortality rate when transferred to soil. Also when using agar gel as in Example I, it was noted that the plants during growth tended to rise up above the gel surface and that this tended to slow down the growth rate, probably because this reduced the ability of the plant to utilize the nutrients of the gel. Also it was noted in Example I that the Hills Orchid Medium tended to produce relatively dry exposed surfaces which are believed to cause production of a higher percentage of unhealthy and unusable plants. The method of Example III overcame the foregoing difficulties and produced a high percentage of healthy plants which could be readily transferred to soil for further growth.

The above plant tissue culture technique produces many advantages. The time taken to grow various strains of plants and to grow crops from commercial plants is substantially shortened. Over 10,000 plantlets may be reproduced in 2 months starting with 1 ounce of tissue from the bank. Banks of tissue culture of desirable strains may be maintained and drawn upon to supply a source of tissue for proliferation and differentiation into plantlets at a desired time for planting. Furthermore, the characteristics of the plant are reproduced directly from an existing plant of desired characteristics free of contaminants.

We claim:

1. A method for producing a pineapple plant culture comprising removing meristem tissue from a donor plant, incising the meristem tissue to promote growth of bud clusters therefrom, said growth occurring while the meristem is in aqueous nutrient medium, and subjecting the bud clusters to predetermined environmental conditions in an aqueous nutrient medium to proliferate the bud clusters without substantial differentiation into plantlets.

2. A method as in claim 1 in which the promoted bud clusters are separated from any remaining donor tissue prior to proliferation.

3. A method as in claim 1 in which the bud clusters are subjected to modified environmental conditions to cause the same to differentiate into plantlets.

4. A method as in claim 1 wherein the meristem tissue removed from the donor plant is a bud meristem.

5. A method as in claim 1 wherein the aqueous nutrient medium contains a carbohydrate, vitamins, trace metallic elements, and ions of potassium, magnesium, calcium, nitrate, phosphate, sulfate, and chelated ferrous ion.

6. A method as in claim 1 together with the steps of storing the proliferated bud clusters in a container bank with sufficient aqueous nutrient medium to substantially cover the bud clusters, maintaining the container bank at conditions whereby differentiation into plantlets is inhibited, agitating the container bank, removing the medium and upper portion of the bud clusters periodically and adding sufficient new medium to again cover the remaining bud clusters.

7. A method as in claim 1 wherein the aqueous nutrient medium contains vitamins, a carbohydrate, trace metallic elements and ions of potassium, magnesium, calcium, nitrate, phosphate, sulfate, and at least about 5 mg/l of chelated ferrous ion and polyvinylpyrrolidone in the quantity of about 50–100 mg/l of medium.

8. A method for reproducing large numbers of pineapple plants from pineapple bud clusters comprising subjecting said bud clusters to predetermined environmental conditions while substantially submerged in an aqueous nutrient medium to proliferate the bud clusters into a mass without substantial differentiation into plantlets, and thereafter exposing a substantial upper surface portion of the proliferated bud cluster mass to the atmosphere and simultaneously contacting a lower surface of the bud cluster mass with aqueous nutrient medium to cause an upper segment of the proliferated bud clusters to differentiate into plantlets.

9. A method as in claim 8 wherein said medium employed for differentiation includes substantially the same type of nutrient as the medium employed for proliferation.

10. A method as in claim 9 in which the nutrient concentration in the proliferation medium is reduced by about 50 to 90 percent in the differentiation medium.

11. A method as in claim 9 wherein the nutrient concentration is reduced by about 70 to 80 percent in the differentiation medium.

12. A method as in claim 9 in which the nutrient medium includes carbohydrates and trace metallic elements, and ions of iron, potassium, magnesium, calcium, nitrate, phosphate and sulfate.

13. A method as in claim 8 in which the proliferation medium nutrients include about 1.5 to 3 percent by weight of carbohydrate along with adequate vitamins and minerals.

14. A method as in claim 8 in which the differentiation medium nutrients include 0.25 to 1 percent by weight of carbohydrate along with adequate vitamins and minerals.

15. A method as in claim 8 wherein differentiation into plantlets is performed on a soft inert gel containing aqueous nutrient medium.

16. A method as in claim 15 wherein the gel is formed of agar dispersed in the aqueous nutrient medium, said agar being present in a quantity of about 1 to 1.4 percent of the medium.

17. A culture comprising granular pineapple bud clusters free-living apart from the donor pineapple plant, at least a portion of the bud clusters being in contact with aqueous nutrient, said bud clusters being characterized by the capacity to proliferate to form more granules without substantial differentiation into plantlets under first predetermined environmental conditions and the capacity to differentiate into a plurality of pineapple plantlets by modifying the environmental conditions.

18. A culture as in claim 17 in which the first environmental conditions comprise submergence in liquid nutrient medium and the second environmental conditions comprise exposure to an oxygen-containing environment.

19. A culture as in claim 17 in which substantially all of the bud clusters are submerged in said medium.

20. A culture as in claim 19 in which an upper surface portion of the bud clusters is exposed to the atmosphere and a lower surface portion of the same is in contact with aqueous nutrient medium.

21. A culture as in claim 20 in which a soft inert gel is dispersed in the aqueous nutrient medium and a lower surface portion of the bud clusters rests on the agar in contact with the medium while an upper surface portion of the bud clusters is exposed to the atmosphere.

* * * * *